United States Patent [19]

Sanders et al.

[11] Patent Number: 5,091,582
[45] Date of Patent: Feb. 25, 1992

[54] PROCESS FOR THE PREPARATION OF AROMATIC POLYAMINES

[75] Inventors: Josef Sanders, Koeln; Gerhard Grögler; Dieter Dieterich, both of Leverkusen, all of Fed. Rep. of Germany

[73] Assignee: Bayer Aktiengesellschaft, Leverkusen Bayerwerk, Fed. Rep. of Germany

[21] Appl. No.: 558,947

[22] Filed: Jul. 27, 1990

Related U.S. Application Data

[63] Continuation of Ser. No. 183,556, Apr. 19, 1988, abandoned.

[30] Foreign Application Priority Data

Apr. 25, 1987 [DE] Fed. Rep. of Germany ....... 3713858

[51] Int. Cl.$^5$ .......................................... C07C 209/36
[52] U.S. Cl. ..................................... 564/418; 564/443
[58] Field of Search ............................... 564/443, 418

[56] References Cited

U.S. PATENT DOCUMENTS

| | | | |
|---|---|---|---|
| 2,888,439 | 5/1959 | Simons | 260/77.5 |
| 3,385,829 | 5/1968 | Heydkamp et al. | 260/75 |
| 3,474,126 | 10/1969 | Heydkamp et al. | 260/471 |
| 3,625,871 | 12/1971 | Traubel et al. | 260/2.5 |
| 3,808,250 | 4/1974 | Blahak et al. | 260/455 |
| 3,865,791 | 2/1975 | Brinkmann et al. | 260/77.5 |
| 4,169,206 | 9/1979 | Mazanek et al. | 560/50 |
| 4,180,644 | 12/1979 | Marquis et al. | 528/68 |
| 4,224,417 | 9/1980 | Hajek et al. | 521/166 |
| 4,247,677 | 1/1981 | Schmidt et al. | 528/68 |
| 4,260,729 | 4/1981 | Schmidt et al. | 528/68 |
| 4,515,923 | 5/1985 | Fauss et al. | 525/127 |
| 4,565,645 | 1/1986 | Rasshofer et al. | 252/182 |
| 4,720,584 | 1/1988 | Dai | 564/315 |
| 4,847,416 | 7/1989 | Durvasula et al. | 564/443 |
| 4,854,935 | 8/1989 | Clausen et al. | 564/443 |

FOREIGN PATENT DOCUMENTS

| | | | |
|---|---|---|---|
| 0268849 | 10/1987 | European Pat. Off. | 564/443 |
| 0288825 | 11/1988 | European Pat. Off. | 564/443 |
| 1122254 | 1/1962 | Fed. Rep. of Germany | |
| 2948419 | 8/1981 | Fed. Rep. of Germany | |
| 3223400 | 12/1983 | Fed. Rep. of Germany | |
| 59-053533 | 3/1984 | Japan | |
| 59-089322 | 5/1984 | Japan | |
| 59-199715 | 11/1984 | Japan | |
| 0758382 | 10/1956 | United Kingdom | 564/443 |
| 9204753 | 3/1963 | United Kingdom | |
| 1117494 | 6/1968 | United Kingdom | |
| 1217735 | 12/1970 | United Kingdom | 564/443 |

*Primary Examiner*—Richard L. Raymond
*Attorney, Agent, or Firm*—Joseph C. Gil; Thomas W. Roy; Godfried P. Akorli

[57] ABSTRACT

The present invention thus relates to new compounds containing aminophenoxy end groups corresponding to the formula

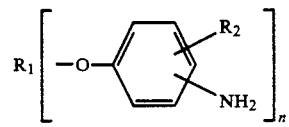

wherein $R_1$ denotes an n-valent group as obtained by the removal of hydroxyl groups from an n-valent polyhydroxyl compound having a molecular weight of about 400 to about 12,000, preferably 400 to about 6,000, $R_2$ denotes an integer with a value from 2 to 8, preferably from 2 to 4.

The present invention also relates to a process for the preparation of these compounds containing aminophenoxy end groups by reacting a polyhydroxyl compound with a halogenated nitrobenzene in the presence of an alkaline compound and subsequently hydrogenating the nitrophenoxy adducts obtained to form the corresponding aminophenoxy adducts.

Lastly, the present invention relates to the use of the compounds containing aminophenoxy end groups as starting components for the production of polyurethane plastics by the isocyanate polyaddition process.

10 Claims, No Drawings

PROCESS FOR THE PREPARATION OF AROMATIC POLYAMINES

This application is a continuation of application Ser. No. 07/183,556 filed Apr. 19, 1988, now abandoned.

BACKGROUND OF THE INVENTION

1. Field of the Invention

This invention relates to new compounds containing aminophenoxy end groups, to a process for their preparation and to their use as starting components for the production of cellular or non-cellular polyurethane plastics and foams.

2. Description of the Prior Art

Polyadducts containing aromatic amino end groups are basically already known. U.S. Pat. No. 2,888,439 and DE-OS 17 20 646 describe the preparation of amino polyethers by the reaction of nitroarylisocyanates with polyols followed by hydrogenation. The analogous reaction of azoaryl isocyanates with polyols also yields aromatic aminopolyethers after reduction (DE-OS 12 57 427). A process in which isocyanate prepolymers are reacted with diamines containing different reactive amino groups is described in DE-OS 11 22 254 and DE-OS 16 94 152. The reaction of isocyanate prepolymers with sulphamic acid according to DE-AS 11 55 907, with formic acid according to FR-PS 14 15 317 or with enamines, aldimines or ketimines containing hydroxyl groups according to DE-OS 21 16 882 and DE-OS 25 46 536 results in aromatic amino polyethers after hydrolysis and saponification as does the thermal splitting of urethanes from isocyanate prepolymers and secondary or tertiary carbinols according to DE-AS 12 70 046. DE-OS 29 48 419, 32 23 397, 32 23 398 and 32 23 400 describe various single stage and two-stage processes for the preparation of aromatic polyamines by the hydrolysis of isocyanate prepolymers in the presence of various solvent and catalyst systems.

All the processes hitherto described take place via isocyanate intermediate stages and therefore invariably yield products containing urethane or urea groups in addition to ether and aromatic amino groups. These products therefore have an undesirably high viscosity for many purposes. Another disadvantage of these additional urethane and urea bonds is their relatively low thermal stability which adversely affects the heat resistance of polyurethane plastics, particularly elastomers, produced from these amino polyethers.

Another possible method for the synthesis of aromatic polyamines is the reaction of isatoic acid anhydride with polyols accompanied by ring opening. Amines of this type are described, for example, in DE-OS 20 19 432, 26 19 840, 26 48 774 and 26 48 825 and in U.S. Pat. No. 4,180,644. Aromatic amino polyethers are also obtained by the reaction of polyoxyalkylene polyols with p-aminobenzoic acid derivatives according to Japanese Patent applications 59 053 533, 59 089 322 and 59 199 715. One disadvantage for many purposes, however, is the low reactivity of the aromatic ester amines obtained by this method.

It was therefore an object of the present invention to provide new aromatic polyamines which would not have the disadvantages mentioned above and would in particular have lower viscosities and react more advantageously with isocyanates. This problem was solved by providing the new compounds containing aminophenoxy end groups and the process described below for their preparation.

SUMMARY OF THE INVENTION

The present invention thus relates to new compounds containing aminophenoxy end groups corresponding to the formula

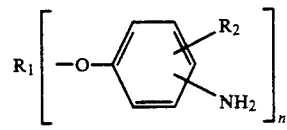

wherein $R_1$ denotes an n-valent group as obtained by the removal of hydroxyl groups from an n-valent polyhydroxyl compound having a molecular weight of about 400 to about 12,000, preferably 400 to about 6,000, $R_2$ denotes a methyl group or preferably hydrogen and n denotes an integer with a value from 2 to 8, preferably from 2 to 4.

The present invention also relates to a process for the preparation of compounds containing aminophenoxy end groups corresponding to the formula

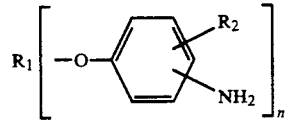

wherein $R_1$, $R_2$ and n have the meanings mentioned above, by
a) the reaction of
  (i) n-valent, relatively high molecular weight polyhydroxyl compounds corresponding to the formula $R_1(OH)_n$ with
  (ii) compounds corresponding to the formula

wherein
$R_2$ has the meaning indicated above and
X stands for fluorine or preferably chlorine and the halogen atom and the nitro group are preferably arranged in the ortho or para position to one another, in the presence of compounds which are alkaline in reaction to yield the corresponding nitrophenoxy adducts represented by the formula

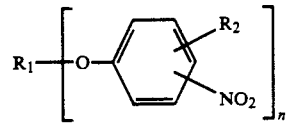

wherein $R_1$, $R_2$ and n have the meanings already mentioned, and b) hydrogenation of the nitrophenoxy adducts to yield the corresponding amino phenoxy adducts.

Lastly, the present invention relates to the use of the compounds containing aminophenoxy end groups as starting components for the production of polyurethane plastics by the isocyanate polyaddition process.

DETAILED DESCRIPTION OF THE INVENTION

Starting materials for the process according to the invention are (i) relatively high molecular weight polyhydroxyl compounds and (ii) optionally methyl-substituted nitrohalogen benzenes.

The polyhydroxyl compounds (i) are preferably high molecular weight compounds having an average molecular weight of 400 to about 12,000 in particular 400 to about 6,000 containing 2 to 8, preferably 2 to 4 reactive hydroxyl groups.

Suitable examples include the hydroxyl group-containing compounds conventionally used in polyurethane chemistry such as hydroxyl-containing polyacetals, polythioethers, polycarbonates, polyamides, polysiloxanes and/or polybutadienes, polyesters, polyacetones and polyethers. Among these, polyethers containing hydroxyl groups are particularly preferred.

The hydroxyl polyethers suitable for the process according to the invention are known and may be prepared, for example, by the polymerization of epoxides such as ethylene oxide, propylene oxide, butylene oxide, tetrahydrofuran, styrene oxide or epichlorohydrin on their own, e.g. in the presence of $BF_3$, or by chemical addition of these epoxides, optionally as mixtures or successively, to starting components containing reactive hydrogen atoms such as water, alcohols or amines. Examples include ethylene glycol, propylene glycol-(1,3) or -(1,2), trimethylol propane 4,4'-dihydroxydiphenyl propane, aniline, ammonia, ethanolamine or ethylene diamine. Sucrose polyethers of the type described, for example, in German Auslegeschriften 1 176 358 and 1 064 938 may also be used according to the invention. It is frequently preferred to use polyethers which contain predominantly primary OH groups (up to about 90% by weight, based on all of the OH groups in the polyether). Polyethers modified by vinyl polymers of the kind obtained, for example, by the polymerization of styrene and acrylonitrile in the presence of polyethers (U.S. Pat. Nos. 3,383,351, 3,304,273, 3,523,093 and 3,110,695 and German Patent 1,152,536) are also suitable, as are polybutadienes containing OH groups.

Suitable polyacetals include the compounds obtained from formaldehyde and glycols such as di- or tri-ethylene glycol, 4,4'-dioxethoxy-diphenyl-dimethylmethan (bisphenol A + 2 mol ethyleneoxid) and hexanediol or by the polymerization of cyclic acetals, such as trioxane.

Suitable polycarbonates containing hydroxyl groups are known and include those prepared by the reaction of diols such as propane-1,3-diol, butane-1,4-diol, hexane-1,6-diol, di-, tri or tetraethylene glycol or thiodiglycol with phosgene or diarylcarbonates, e.g. diphenylcarbonate (DE-B 1,694,080, 1,915,908 and 2,221,751; DE-A 2,605,024).

The polyesters of dicarboxylic acids and diols may be those obtained from adipic acid and isophthalic acid and straight chained and/or branched diols as well as lactone polyesters, preferably those based on caprolactone and starter diols.

Particularly important among the polythioethers are the condensation products obtained by reacting thiodiglycol on its own and/or with other glycols.

Polyhydroxyl compounds already containing urethane or urea groups and modified or unmodified natural polyols may also be used. Products of addition of alkylene oxides to phenolformaldehyde resins or to ureaformaldehyde resins may also be used according to the invention. Furthermore, amide groups may be introduced into the polyhydroxyl compounds as described e.g. in DE-A 2,559,372.

Polyhydroxyl compounds in which high molecular weight polyadducts or polycondensates or polymers are present in a finely dispersed or dissolved form may also be used according to the invention. Polyhydroxyl compounds of this type may be obtained, for example, by carrying out polyaddition reactions (e.g. reactions between polyisocyanates and amino functional compounds) or polycondensation reactions (e.g. between formaldehyde and phenols and/or amines) in situ in the above mentioned compounds containing hydroxyl groups. Processes of this type are described, for example, in DE-B 1,168,075 and 1,260,142 and DE-A 2,324,134, 2,423,984, 2,512,385, 2,513,815, 2,550,796, 2,550,797, 2,550,833, 2,550,862, 2,633,293 and 2,639,254. The required compounds may also be obtained according to U.S. Pat. No. 3,869,413 or 2,550,860 by mixing a previously prepared aqueous polymer dispersion with a polyhydroxyl compound and then removing water from the mixture.

Polyhydroxyl compounds modified with vinyl polymers such as those obtained, for example, by the polymerization of styrene and acrylonitrile in the presence of polycarbonate polyols (DE-PS 1,769,795, U.S. Pat. No. 3,637,909) are also suitable for the process according to the invention. Synthetic resins with exceptional flame resistance may be obtained by using polyether polyols which have been modified by graft polymerization with vinyl phosphonic acid esters and optionally (meth)acrylonitrile, (meth)acrylamide or OH-functional (meth)acrylic acid esters according to DE-A 2,442,101, 2,644,922 and 2,646,141.

When modified polyhydroxyl compounds of the type mentioned above are used as starting materials for the polyamines, the resulting starting components used in the polyisocyanate polyaddition processes in many cases result in polyurethanes which have substantially improved mechanical properties.

Suitable, although less preferred, polyhydroxyl components (i) also include the organofunctional polysiloxanes containing two terminal isocyanate-reactive groups and structural units of the formula $-O-Si(R)_2$ in which R denotes a $C_1-C_4$ alkyl group or a phenyl group, preferably a methyl group. Both the known, pure polysiloxanes containing organofunctional end groups and the known siloxane polyoxyalkylene copolymers containing organofunctional end groups are suitable starting materials according to the invention.

Preferred organopolysiloxanes correspond to the general formula

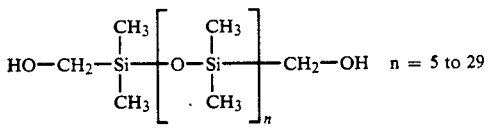

They are prepared in known manner by the equilibration of 1,1,3,3-tetramethyl-1,3-hydroxymethyldisiloxane of the formula

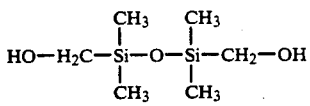

with octamethylene cyclotetrasiloxane in the presence of sulfuric acid or by the process according to DE-B 1,236,505.

Starting materials (ii) according to the present invention include halogenated nitrobenzenes optionally substituted with methyl groups represented by the formula

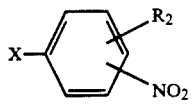

wherein
$R_2$ stands for hydrogen or a methyl group, preferably hydrogen and
X stands for fluorine or preferably chlorine and wherein the halogen substituents and nitro substituents are preferably in the ortho or para position to one another.

Examples of suitable compounds of this type include 2-nitrochlorobenzene, 2-nitrofluorobenzene, 4-nitrochlorobenzene, 4-nitrofluorobenzene, 1-methyl-2-nitro-3-chlorobenzene, 1-methyl-2-nitro-3-fluorobenzene, 1-methyl-4-nitro-5-chlorobenzene, 1-methyl-4-nitro-5-fluorobenzene, 1-methyl-2-nitro-6-chlorobenzene and 1-methyl-2-nitro-6-fluorobenzene. 2-nitro-chlorobenzene and 4-nitro-chlorobenzene are particularly preferred starting materials (ii).

Examples of compounds which are alkaline in reaction as required for the reaction of polyhydroxyl compounds (i) with the halogenated nitrobenzenes (ii) include metal hydrides, metal alkoxides and, preferably, metal hydroxides. Sodium hydroxide and potassium hydroxide are particularly preferred.

For carrying out stage a) of the process according to the invention, the starting materials (ii) may be used in stoichiometric quantity, in excess or in subequivalent quantity with respect to component (i). The quantity of component (ii) is preferably calculated to provide about 1 to 1.5 mol of component (ii) for each equivalent of hydroxyl groups of component (i). The hydrogen halide released in the reaction are bound by the addition of metal hydrides, metal alkoxides or metal hydroxides as mentioned above. They are used in at least sufficient quantity to ensure neutralization of the hydrogen halide split off. They are most preferably used in the quantity required to provide from 1 to 3 mol of base per equivalent hydroxyl groups.

Stage a) of the process according to the invention may be carried out solvent free or in the presence of an organic solvent, optionally in the presence of a phase transfer catalyst. The components for the reaction may be present in a homogeneous phase or diphasic, i.e., as solutions, emulsions or suspensions.

Examples of suitable organic solvents include benzene, toluene, xylene, chlorobenzene, dichlorobenzene, trichlorobenzene, diethylether, diisopropylether, tert.-butylmethylether, tetrahydrofuran, dioxane, ethylene glycol dimethylether, ethyl acetate, acetone, methylethylketone, acetonitrile, furfural, methylene chloride, chloroform, trichloroethylene, tetrachloroethylene, nitromethane and nitropropane. Polar aprotic solvents are preferred and include dimethylformamide, dimethylacetamide, N-methylpyrrolidone, tetramethyl urea, N-methylcaprolactam, dimethyl sulphoxide, tetramethylene sulphone, hexamethylene phosphoric acid triamide, etc. Dimethylformamide, dimethyl sulphoxide and N-methyl pyrrolidone are particularly preferred. Mixtures of such solvents may, of course, also be used.

The quantity of solvent used is generally calculated to be sufficient to form a clear solution of starting materials (i) and (ii). In practice, this means that the solvents are generally used in a quantity of about 50 to 1,000, preferably about 100 to 500 parts by weight of solvent per 100 parts by weight of the mixture of components (i) and (ii).

It may in some cases be advantageous to carry out the reaction in the presence of a phase transfer catalyst. Catalysts of this type are described, for example, by E. V. and S. S. Dehmlow in Phase Transfer Catalysis, Second Edition, Verlag Chemie 1983. Suitable catalysts include the quaternary ammonium and phosphonium salts of the formula

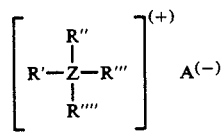

wherein
Z denotes nitrogen or phosphorous and,
R', R'', R''' and R'''' may be identical or different and denote alkyl groups with 1 to 18 carbon atoms wherein one of the groups may be an araliphatic group with 7 to 15 carbon atoms, and the sum of carbon atoms in the four groups is preferably 12 to 31.

Typical examples of suitable catalysts include N-benzyl-N,N,N-triethyl-ammonium chloride or bromide, N-benzyl-N-dodecyl-N,N-dimethyl-ammonia chloride or bromide, N,N,N,N-tetra-n-hexyl-ammonium chloride or bromide, N-benzyl-N,N,N-tri-n-octyl-ammonium chloride or bromide and the phosphonium salts corresponding to these ammonium salts.

For the process according to this invention, the quaternary ammonium and phosphonium salts mentioned as examples are preferably used solvent free or in the form of their aqueous solutions (for example with a solids content of about 30 to 60% by weight) and preferably in a quantity of about 1 to 10 mol %, based on the equivalents of hydroxyl groups present.

When polar aprotic solvents such as dimethylformamide, N-methyl pyrrolidone or dimethyl sulphoxide are used, as is preferred for the process according to the invention, there is no disadvantage in omitting the use of phase transfer catalysts.

Stage a) of the process according to the invention is generally carried out at about 10° to 100° C., preferably about 20° to 60° C., with excess pressure, reduced pressure or preferably ambient pressure, and either continuously or batchwise. The reaction time is generally about 0.5 to 24 hours, preferably about 0.5 to 8 hours.

Stage a) of the process according to the invention may be carried out, for example, by introducing the starting materials and optionally the phase transfer catalyst into the reaction vessel in the selected solvent and adding the base in the form of a solution or suspension or, preferably, in a solid, very finely ground form, either portion-wise or continuously with stirring and optionally with cooling. Stirring is then continued at room temperature or optionally at elevated temperature until complete conversion of the hydroxyl groups initially present is determined by IR-spectroscopy and/or no starting material (ii) can be detected by thin layer or gas chromatography.

The nitrophenoxy adducts are worked up in known manner, suitably by diluting the reaction mixture with a water immiscible inert solvent, washing with water or salt solution until neutral, distilling off the solvent (optionally under vacuum) and drying the product under vacuum.

Neutralization of the reaction mixture may also be carried out by treating it with $CO_2$. The inert solvents used include toluene, methylene chloride, chlorobenzene, dichlorobenzene, 1,2-dichloroethane, trichloroethylene, etc. The crude product obtained may generally be worked up without further purification but if it still contains small quantities of starting material (ii) due to incomplete conversion, this may be removed by sublimation in a high vacuum or advantageously by thin layer distillation.

It is possible in principle but is less preferred to transfer the reaction mixture obtained from stage a) directly to stage b) without first isolating it stage a) directly to stage b) without first isolating it and optionally first neutralizing the excess alkali metal hydroxide.

The compounds containing nitrophenoxy end groups obtained in stage a) of the process according to the invention are converted into the corresponding polyamines in stage b) in known manner by reduction with nascent or catalytic hydrogen, for example hydrogen which has been activated with Raney nickel or with palladium on charcoal. This hydrogenation may be carried out in the presence or absence of inert solvents, at about 20° to 120° C. and under a pressure of about 20 to 80 bar. Suitable solvents include methanol, ethanol, i-propanol, toluene and DMF, among others. Methanol is preferred. The diamines are obtained as distillation residue from the distillative removal of solvent and may be used for production of polyurethane resins without further purification.

The polyamines according to the invention obtained from working up the reaction mixture are generally products with a brownish color and are distinguished from previously known aromatic aminopolyethers by their substantially lower viscosity. Apart from the functional groups already present in the polyhydroxyl compounds from which they have been obtained, e.g. ether groups, thioether groups, dialkyl siloxane, carbonate groups and/or polybutadiene groups, they only contain ether groups corresponding in number to their functionality. The aromatic polyamines according to the invention are suitable reactants for free or blocked polyisocyanates used for the preparation of polyurethanes (polyurethane ureas), optionally cellular polyurethane resins or polyurethane foams, and for this purpose they may also be combined with other, low molecular weight, (molecular weight 32 to 399) and/or relatively high molecular weight (molecular weight from 400 to about 12,000) compounds containing at least two isocyanate-reactive groups. Suitable starting components for the preparation of polyurethane resins are mentioned, for example, in DE-A 2,302,564, DE-A 2,432,764 U.S. Pat. No. 3,903,679) and DE-A 2,639,083, 2,512,385, 2,513,815, 2,550,796, 2,550,797, 2,550,833, 2,550,860 and 2,550,862. These literature references also mention auxiliary agents and additives optionally used for the preparation of polyurethanes.

The polyamines according to this invention are particularly suitable for use in combination with solid polyisocyanates. According to DE-A 3,230,757 (U.S. Pat. No. 4,483,974, herein incorporated by reference in its entirety), these components may be used to produce reactive systems which are indefinitely stable in storage at room temperature or even elevated temperature and undergo curing only when subjected to more intense heating. Systems of this type are generally referred to as 1-component systems. Dimeric 2,4-diisocyanatotoluene (TT) and 3,3'-dimethyl-4,4'-diisocyanatodiphenyl urea (TDIH) are examples of suitable solid polyisocyanates.

The preparation of polyurethane (urea)s from the polyamines prepared according to this invention is also a subject of the present invention. These polyurethane(urea)s may be used, for example, for elastomers, coatings, filaments applied from melts, solutions or dispersions and reactive component mixtures. The polyamines prepared according to the invention may also be used, for example, as coupling components for diazo dyes, hardeners for epoxides and phenol resins and any other known reactions of amines, such as the formation of amides or imides.

The following examples serve to illustrate the preparation of the compounds according to the invention.

EXAMPLES

Example 1 a) Nitrophenylation

A total of 120 g (3 mol) of powdered sodium hydroxide was added portion-wise over a period of 2 hours, with stirring, to a solution of 750 g (0.75 mol) of a dehydrated polypropylene oxide ether diol (OH number 112) and 307 g (1.95 mol) of 4-chloronitrobenzene in 1,000 ml of dimethylsulphoxide (DMSO). Stirring was then continued for 3 hours at room temperature and a further 4 hours at 50° C. The reaction mixture was then diluted with 1,500 ml of toluene and 50 ml of water, $CO_2$ was introduced for 1 hour with stirring and the product was dehydrated over $CaCl_2$. After the solvent had been drawn off, the crude product was thin layered at 140° C. and 0.13 m bar.

Yield: 878 g (94% of theoretical)
Viscosity: 640 mPa.s/25° C. (brown oil)
OH number: 1 b) Hydrogenation 3,000 g (2.42 mol) of the nitrophenoxy adduct according to Example 1a were hydrogenated in 11 liters of methanol in the presence of 450 g of Raney nickel at 60° C. and 50 bar.

When the absorption of hydrogen ceased, the catalyst was removed by filtration and the solvent was drawn off under vacuum.

Yield: 2,741 g (96% of theoretical)
Viscosity: 1,090 mPa.s/25° C. (dark oil)
Amine number: 102

Example 2 a) Nitrophenylation 1,000 g (0.5 mol) of polypropylene oxide ether diol (OH number 56), 205 g (1.3 mol) of 4-chloronitrobenzene and 80 g (2 mol) of powdered sodium hydroxide were reacted in 1,000 ml of DMSO as in Example 1a.

Yield: 989 g (88% of theoretical)
Viscosity: 720 mPa.s/25° C. (brown oil)
OH number: 2 b) Hydrogenation 3,000 g (1.34 mol) of the nitrophenoxy adduct of Example 2a in 11 liters of methanol were hydrogenated in the presence of 450 g of Raney nickel as in Example 1b.

Yield: 2,748 g (94% of theoretical)
Viscosity: 1,020 mPa.s/25° C. (dark oil)
Amine number: 56

Example 3 a) Nitrophenylation 750 g (0.25 mol) of polypropylene oxide ether triol (OH Number 56), 153.6 g (0.98 mol) of 4-chloronitrobenzene and 60 g (1.5 mol) of powdered sodium hydroxide were reacted together in 1,000 ml of N-methylpyrrolidone as in Example 1a.

Yield: 720 g (86% of theoretical)
Viscosity: 1,100 mPa.s/25° C. (dark oil)
OH number: 6 b) Hydrogenation 530 g (0.16 mol) of the nitrophenoxy adduct according to Example 3a were hydrogenated in 1,500 ml of methanol in the presence of 80 g of Raney nickel as in Example 1b.

Yield: 469 g (91% of theoretical)
Viscosity: 1450 mPa.s/25° C. (dark oil)
Amine number: 46

Example 4 a) Nitrophenylation 700 g (0.5 mol) of polyethylene oxide ether diol (OH number 80), 205 g (1.3 mol) of 4-chloronitrobenzene and 80 g (2 mol) of powdered sodium hydroxide were reacted in 1,000 ml of DMSO as in Example 1a.

Yield: 705 g (86% of theoretical)
Viscosity: 270 mPa.s/50° C. (yellowish wax at 25° C.)
OH number: 1 b) Hydrogenation 500 g (0.3 mol) of the nitrophenoxy adduct according to Example 4a were hydrogenated in 1,600 ml of methanol in the presence of 75 g of Raney nickel as in Example 1b.

Yield: 429 g (89% of theoretical)
Viscosity: 640 mPa.s/50° C. (brownish was at 25° C.)
Amine number: 68

Example 5 a) Nitrophenylation 750 g (0.75 mol) of polytetrahydrofuran ether diol (OH number 112), 307 g (1.95 mol) of 4-chloronitrobenzene and 120 g (3 mol) of powdered sodium hydroxide were reacted together in 1,000 ml of DMSO as in Example 1.

Yield: 813 g (87% of theoretical)
Viscosity: 1,350 mPa.s/25° C.
OH number: 4 b) Hydrogenation 670 g (0.54 mol) of the nitrophenoxy adduct according to Example 5a were hydrogenated in 1,400 ml of methanol in the presence of 100 g of Raney nickel as in Example 1b.

Yield: 586 g (91% of theoretical)
Viscosity: 1,650 mPa.s/25° C. (dark oil)
Amine number: 98

EXAMPLES OF APPLICATION

Example I 200 g of the amino polyether (amine number 56) prepared in Example 2b were degassified in a water jet vacuum at room temperature for 15 minutes and 42.1 g of finely ground dimeric 2,4-diisocyanato toluene (TT) having an average particle size of from 10–30 μ were added. A very finely divided suspension was then prepared by brief, intensive stirring (about 1 minute) and this suspension was then poured within 2 to 3 minutes into a mold which had been treated with mold release agents and preheated to 100° C. After about 30 to 60 minutes at 120°–130° C., the test sample which had solidified was removed from the mold and it was then tempered at this temperature for a further 3 to 4 hours. The mechanical properties of the highly elastic polyurethane elastomer obtained are shown in Table 1.

Example II

A reaction mixture which would have to be worked up within 2 to 3 minutes was first prepared by a method analogous to that of Example I, but the casting or pot life of the reaction system described was considerably increased by the addition of from 0.2 to 0.4 g of 3,3'-dimethyl-4,4'-diamino-dicyclohexylmethane according to DOS 3,230,757 to render it suitable for practical requirements. The reaction systems thus obtained remained in a suitable state for working up for several days even at elevated temperatures (about 50°–60° C.). A highly elastic polyurethane elastomer having the level of properties obtained in Example 1 was obtained.

Example III 200 g of the aminopolyether with amine number 56 prepared in Example 2b and 36.4 g of finely ground 3,3'-dimethyl-4,4'-diisocyanatodiphenyl urea (TDIH: reaction product of 2,4-diisocyanato toluene (TDI) and 1 mol of $H_2O$, NCO content 24.3%) having an average particle size of 10 to 30 μ were reacted together analogously to Example II. The mechanical properties of the highly elastic polyurethane elastomer obtained are shown in Table 1. The results of thermomechanical analysis (TMA) carried out on this material showed that a significant drop in mechanical values occurred only above 200° C. The elastomer obtained therefore had excellent heat resistance.

Example IV 200 g of the aminopolyether (amine number 102) prepared in Example 1b were reacted with 66.5 g of 3,3'-dimethyl-4,4'-diisocyanato-diphenyl urea by a method analogous to that of Example II. The mechanical properties of the highly elastic polyurethane elastomer obtained are shown in Table 1.

Example V 200 g of the aminopolyether (amine number 98) prepared in Example 5b were reacted with 63.6 g of 3,3'-dimethyl-4,4'-diisocyanato-diphenyl urea by a method analogous to that of Example II. The mechanical properties of the highly elastic polyurethane elastomer obtained are shown in Table 1.

TABLE 1

|  | Example Number | | | |
| --- | --- | --- | --- | --- |
|  | I | III | IV | V |
| Modulus (100%) MPa | 5.0 | 7.5 | 20.5 | 22.2 |
| Tensile strength/MPa | 9.5 | 11.5 | 28.1 | 32.2 |
| Elongation at Break/% | 250 | 300 | 400 | 500 |
| Tear propagation resistance/KN/m | 20 | 30.2 | 80.5 | 84.0 |
| Elasticity/% | 45 | 48 | 52 | 59 |
| Hardness/Shore A | 92 | 92 | 94 | 97 |
| Hardness/Shore B |  |  |  | 61 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a compound containing aminophenoxy end groups and corresponding to the formula

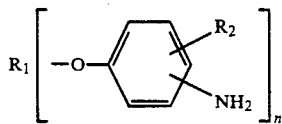

wherein
$R_1$ denotes an n-valent group obtained by the removal of the hydroxy groups from an n-valent polyhydroxyl compound having a molecular weight of 400 to about 12,000,
$R_2$ denotes hydrogen or a methyl group and
n represents an integer with a value from 2 to 8,
a) which comprises reacting in the absence of a solvent
(i) an n-valent, relatively high molecular weight polyhydroxyl compound corresponding to the formula $R_1(OH)_n$ with
(ii) a compound corresponding to the formula

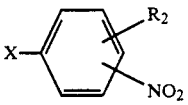

wherein
X is chlorine or fluorine in the presence of compounds which are alkaline in reaction and
b) hydrogenating the resulting nitrophenoxy adducts corresponding to the formula

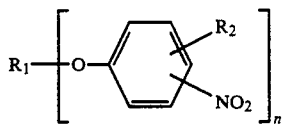

to form the corresponding amine.

2. The process of claim 1 which comprises carrying out stage a) in the presence of powdered sodium and/or potassium hydroxide in a quantity at least sufficient for neutralizing the hydrogen halide split off.

3. The process of claim 1 wherein X stands for chlorine.

4. The process of claim 2 wherein X stands for chlorine.

5. A process for the preparation of a compound containing aminophenoxy end groups and corresponding to the formula

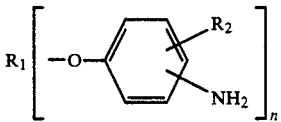

wherein
$R_1$ denotes an n-valent group obtained by the removal of the hydroxy groups from an n-valent polyhydroxyl compound having aliphatically-bound hydroxy groups and a molecular weight of 400 to about 12,000,
$R_2$ denotes hydrogen or a methyl group and
n represents an integer with a value from 2 to 8,
a) which comprises reacting in the presence of a highly polar aprotic solvent
(i) an n-valent, relatively high molecular weight polyhydroxyl compound corresponding to the formula $R_1(OH)_n$ with
(ii) a compound corresponding to the formula

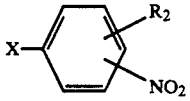

wherein
X is chlorine or fluorine in the presence of compounds which are alkaline in reaction and
b) hydrogenating the resulting nitrophenoxy adducts corresponding to the formula

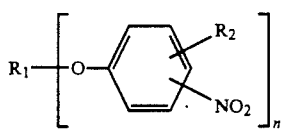

to form the corresponding amine.

6. The process of claim 5 wherein X stands for chlorine.

7. The process of claim 5 which comprises carrying out stage a) in the presence of powdered sodium and/or potassium hydroxide in a quantity at least sufficient for neutralizing the hydrogen halide split off.

8. The process of claim 5 which comprises carrying out stage a) in the presence of DMSO.

9. The process of claim 7 wherein X stands for chlorine.

10. The process of claim 8 wherein X stands for chlorine.

* * * * *